Oct. 24, 1967 C. L. VICE 3,349,193

MAGNETIC RECORDING HEAD WITH UNITARY SUPPORTING BODY

Original Filed Sept. 27, 1962

INVENTOR.
CHARLES L. VICE

BY Angus & Mon

ATTORNEYS.

United States Patent Office 3,349,193

Patented Oct. 24, 1967

3,349,193
MAGNETIC RECORDING HEAD WITH UNITARY SUPPORTING BODY

Charles L. Vice, 85 Gresham Lane, Atherton, Calif. 94025

Original application Sept. 27, 1962, Ser. No. 226,542, now Patent No. 3,271,843, dated Sept. 13, 1966. Divided and this application May 26, 1966, Ser. No. 553,109
7 Claims. (Cl. 179—100.2)

This application is a division of applicant's copending patent application Ser. No. 226,542, filed Sept. 27, 1962, now Patent No. 3,271,843, entitled, "Magnetic Recording Head and Method for Making the Same."

This invention relates to a magnetic recording or playback head and to a method for making the same.

Magnetic recording heads (which term is inclusive of playback heads herein) for recording signals from a number of channels through a number of heads on a single tape are well known. These devices must be manufactured to very close tolerances in order that there may be a close relationship between the magnetic path on the tape and the location of the head. Heretofore, the manufacture of magnetic recording heads with good characteristics and close tolerances has been a most difficult and expensive matter. In fact, many undesirable compromises had to be made in order to assemble the heads at all, and optimum characteristics have not heretofore been secured.

It is an object of this invention to provide an assembly technique whereby magnetic recording heads having optimum physical characteristics can readily be assembled in routine production operations.

Another object of the invention is to provide novel means for winding the cores of magnetic recording heads.

A method of making a magnetic recording head of this invention includes utilizing a body which has a face and an outer wall. A hole is bored into the body near the face, the radius of the hole being smaller than the distance of the center of the hole from the face. Thereafter, a groove is undercut in the wall of the hole, the depth of the groove being greater than the difference between the radius and the said distance so that the groove forms an opening in the face.

An entry port is formed through the outer wall of the body into the groove so that a gapped, wound core can be inserted into the groove through the entry port with the gap located in the opening, and the core seated in the groove. Thereafter, the core is fastened in the groove.

According to a preferred but optional feature of this invention, a generally U-shaped core providing a central bight and a pair of spaced-apart arms receives wire wound on its arms to form a coil by being chucked with an arm to be wound as an axis in a rotary chuck, and introducing the wire for the coil into the region between the arms at a location such that the gap between the arms periodically passes over the wire as the arm rotates, while moving the wire being introduced axially along the arm to form the coil.

According to another preferred but optional feature of the invention, at least a portion of the periphery of the core has an arc of radius substantially equal to that of the groove, whereby the core can be angularly moved accurately to position the gap in the opening.

The above and other features of this invention will be fully understood from the following detailed description and the accompanying drawings in which.

Figures 1, 2, 3, 4, 5, 6, 7, 8, 9, 10, 11:
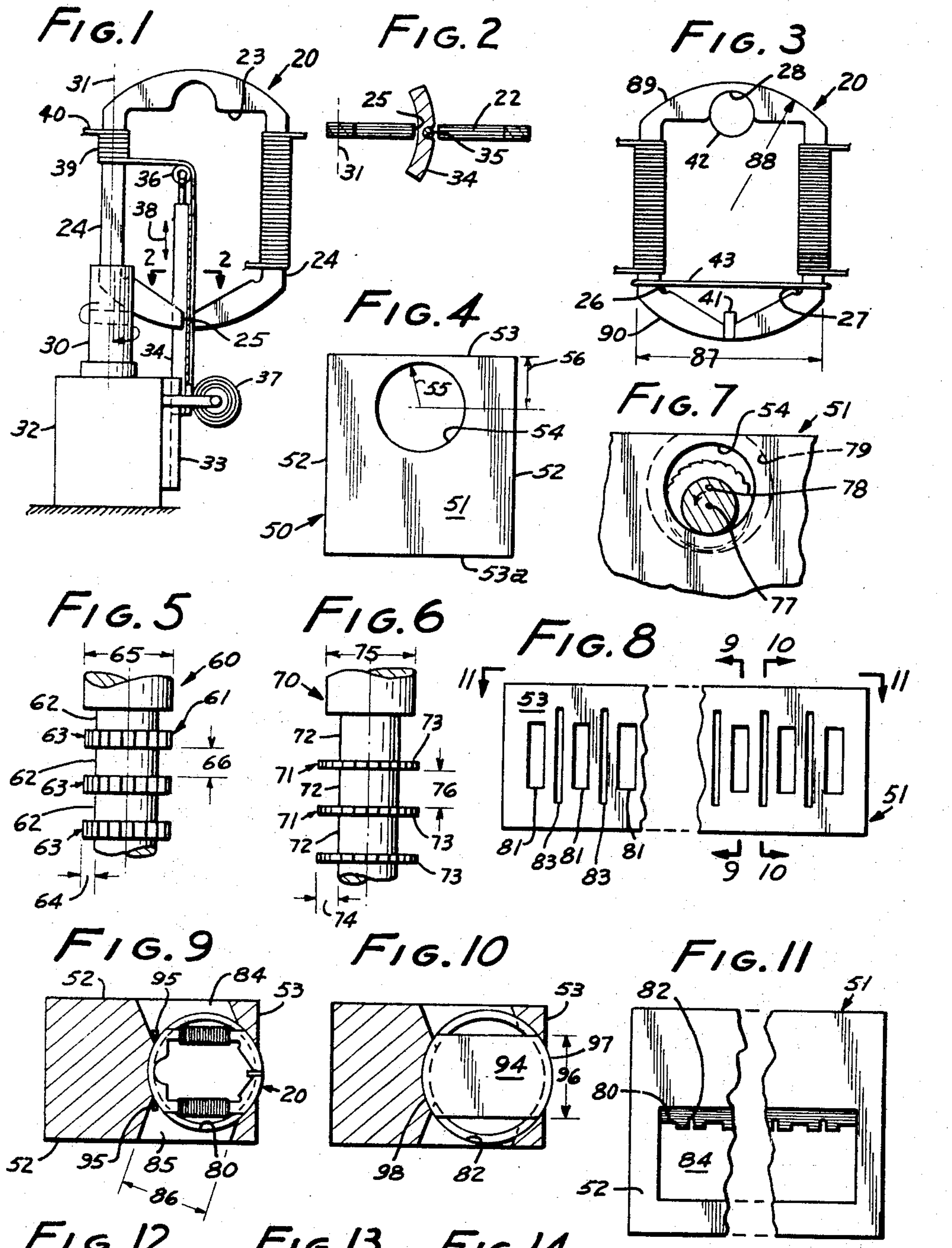
FIG. 1 is a side elevation, partly in schematic notation, showing a core suitable for use in the present invention in the process of having a coil wound on one of its arms.
FIG. 2 is a fragmentary cross-section taken at line 2—2 of FIG. 1.
FIG. 3 is a side elevation of a core wound by the device of FIG. 1.
FIG. 4 is an end view of an intermediate configuration of a body according to the invention which is to receive cores such as that shown in FIG. 3.
FIGS. 5 and 6 are side views of milling cutters for use in modifying the structure of FIG. 4.
FIG. 7 is an end view of a fragment of the device of FIG. 4 being modified by one of the cutters of FIGS. 5 and 6.
FIG. 8 is a top view of the device of FIG. 4 in a later configuration in manufacture.
Figures 12, 13, 14:
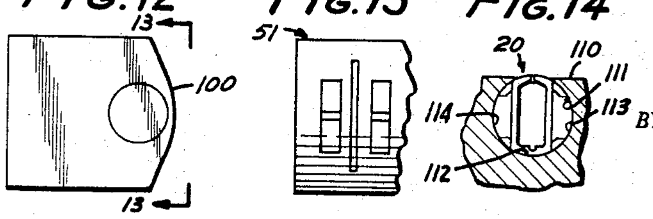

FIGS. 9 and 10 are cross-sections taken at lines 9—9 and 10—10, respectively, of FIG. 8;

FIG. 11 is a side view taken at line 11—11 of FIG. 8;

FIG. 12 is an end view of the final product;

FIG. 13 is a top view of FIG. 12 taken at line 13—13 therein; and

FIG. 14 is an end view of an alternate embodiment of the invention.

FIG. 1 illustrates a core 20 for a magnetic recording head according to this invention. The core comprises a stack of laminations 22 of magnetizable material, each lamination having a central bight 23 and a pair of spaced-apart arms 24 with a pair of parallel portions. A gap 25, which is ordinarily about 0.010″ wide, is formed between the free ends of the arms. Three reliefs 26, 27, 28 are formed inside the arms. Reliefs 26 and 27 are in medial portions of the arms. Relief 28 is located at the central portion of the bight. The reliefs provide means for stacking a plurality of the laminations on locating pins (not shown) to form a straight stack which can be properly laminated.

After the stack is laminated, one of its arms is placed in a chuck 30, the axis of rotation 31 of the chuck being coincident with the center line of the parallel portion of the arm being wound. The base of the chuck is mounted to a table 32, to which table there is also mounted a slide 33. The slide carries a curved shield 34 with a groove 35 (FIG. 2) therein. An idler wheel 36 is mounted to the upper end of the shield between the arms. A wire spool 37 is also mounted to the slide. The slide is mounted for axial movement in the directions indicated by arrow 38, so that idler wheel 36 can be moved in these directions to lay out the wire along the arm while the chuck is rotated.

In order to wind a coil 39 on an arm 24, one end 40 of the wire is temporarily fastened to the arm and then the chuck is turned. As the chuck is turned, it rotates the stack of laminations around the axis, thereby causing the arm to rotate and draw wire over idler wheel 36. The gap periodically passes over the shield as shown in FIG. 2. The slide is moved axially relative to the arm to lay the wire along the arm in coil form. After the coil is wound, the wire is cut, and the other arm 24 is chucked up and the process is repeated. This provides a simple and accurate means for winding coils on the arms of cores.

The next step in the assembly of a core suited for use in this invention is to place a shim 41 inside the gap. The thickness of the shim material is selected for the clearance desired, the thickness generally being of the order of a few thousandths of an inch. The shim is made of electrically conductive, but not magnetic, material such as silver. With the shim material loosely held in place, the stack of laminations is placed so that a pin 42 fits in relief 28. Then the two arms 24 are drawn together as shown in FIG. 3 and tied firmly against the shim by a flexible tie 43 made of cord such as nylon, and the core is then removed from the pin. This holds the shim material firmly in place, and the excess shim material is trimmed off. Use of the pin in the tying step minimizes stressing at the central portion of the bight, thereby preventing undesirable changes in the magnetic characteristics of the metal of which the core is made. Tying the arms together against the shim properly sets the gap. Unlike known techniques which require the shim to be held by the arms and thereby require distortion of the metal to overcome springback, this technique keeps distortion to a minimum because external forces are maintained by the tie to keep the shim in place. The external tie permits control of pressure at the gap, thereby maintaining close control over H and Q.

Heretofore, a back gap has been needed for assembly in cores of this general type, which is disadvantageous. The core made as aforesaid is unitary, has no back gap, and is readily manufactured to close tolerances.

A body 50 suited to receive cores such as core 20 is made from a body 51 having an outer wall 52 and faces 53 and 53*a*. Initially, a circular bore 54 is drilled in the block parallel to face 53. The bore has a radius 55. The center of the bore is spaced from the face by a distance 56, the radius 55 being smaller than the distance 56.

Grooves are next formed in the wall of bore 54 by undercutting means. This undercutting may be carried out by the use of conventional internal-groove-forming tools, but inasmuch as very close dimensional tolerances must be maintained to produce an optimum magnetic recording head, the special groove-forming technique hereinafter to be described proves to be very advantageous.

The first cutter 60 shown in FIG. 5 is used to cut first grooves in the block. This cutter is conveniently formed from a common fluted end mill having cutting flutes 61. These flutes are interrupted by forming grooves 62 in the surface of the cutter, leaving cutting lands 63 between them. The grooves have a depth 64 within a peak diameter 65. The grooves may serve to limit the depth of penetration of the cutting lands if desired, or this may be controlled by the machine which suspends and rotates the cutter. Either way, the depth 64 is greater than the difference between radius 55 and distance 56, so that a groove can be cut which will form openings in the face of the body.

The width 66 of the grooves represents the spacing between the nearest sides of the first grooves formed by the cutter when a plurality of grooves is cut.

A second cutter 70 for forming second grooves is similarly formed from a fluted end mill having cutting flutes 71, grooves 72, and cutting lands 73. The grooves have a depth 74 with a peak diameter 75. The grooves have a width 76.

The axial positions in the body at cutting position of the cutters of FIGS. 5 and 6 are shown by their relative positions in the drawings. Cutting lands 73 will cut grooves in portions left uncut by the first cutter so as to form second grooves between the first grooves.

Preferably, but not necessarily, the depth of grooves 72 is greater than the depth of grooves 62, because in the preferred embodiment of the invention, it is desirable for the diameter of the grooves formed by cutting lands 73 to be greater than those formed by cutting lands 63. That is to say that the diameter of the second grooves ought to be larger than those of the first grooves.

FIG. 7 is a schematic illustration showing the formation of one set of grooves with the cutting tools of FIGS. 5 and 6. The body is preferably placed on the rotary table of a vertical mill, and the body and the cutter are started in relative rotation. The center 77 of the cutter is first moved down along the center of rotation 78 of the body, which is coincident with the center of bore 54. When the desired relative axial position between the bore and the cutter is reached, then the body is offset relative to the cutter by the desired depth of groove to be formed. This offset will not, of course, be greater than the depth of the grooves in the cutter, although it might be equal to it. Thereafter, with the continuing relative rotation, a groove such as groove 79 is formed, which forms a round groove, and also an opening in the face of the body.

The body configuration resulting from the operation of FIG. 7 is shown in FIG. 8. A plurality of first grooves 80 opens on the outside surface of the body at first openings 81. Second grooves 82 open onto a surface of the body at second openings 83. The first and second grooves and openings are in alternate sequence, and as many are formed as there were cutting lands in operation on the cutters.

Next, a pair of entry ports 84, 85 is formed in the side of the body, such as by routing or milling. While a device according to this invention may be manufactured and assembled with only one entry port, the use of two greatly facilitates the assembly process.

The width 86 of the entry ports is substantially equal to the width 87 between the outsides of the coils wound on the arms of the cores.

Radius 88 of arcuate portions 89, 90 of the cores is substantially equal to the radius of the first grooves 80. As can best be seen in FIG. 9, a core 20 has been inserted through entry port 84 with the arms aligned with the sides of the entry port. Once the center of the core reaches the center of the groove, then the core can be grasped through both entry ports 84 and 85. The core will be seated firmly against the bottom of the groove. There may be some small clearance between the walls of the groove and the sides of the core, although these tolerances are usually held fairly closely. In order to position the core exactly, the body may be placed beneath a microscope and the center of the gap properly aligned, at which time precision wedges 95 may be pressed between the core and the wall of the groove to hold the core firmly locked in position. This process is individually carried out for a core inserted in each one of the first grooves.

Next, shielding plates 94 (FIG. 10) having a width 96 and arcuate edges 97, 98 are passed through the entry port in the same way as the cores, and finally rotated to the position shown in FIG. 10 in respective second grooves 82. The arcs of the shielding plates have about the same radius as the second grooves. At this stage of assembly, there will be a core and shield disposed in all respective first and second grooves, and they will all project beyond face 53. The ends of the coils are brought out the entry ports. Now all components may finally be fastened into the body, preferably by injection of a settable potting composition (not shown). It will be understood that the potting composition can fill in the central portions of the core, and in between the cores and shield plates, and can also fill in the entry ports so that a solid structure results. A suitable potting composition is Houghton Laboratories Type 6040, low heat distortion epoxy resin. After the potting composition has hardened, the recording head can be trimmed down to the desired ultimate configuration shown in FIGS. 12 and 13, with a crowned top face 100 over which the tape will pass. The resulting cores and shields are illustrated in FIG. 13.

FIG. 14 illustrates an alternate intermediate configuration corresponding to that of FIGS. 9 and 10. In this embodiment, body 110 includes a bore 111, and undercut grooves 112 identical to those in FIGS. 1–13. Axial slots 113, 114 are cut in the wall of the bore with a base radius at least as great as the largest groove radius. Then a core 30 (or a shielding plate 96) can be moved axially down the slots, and rotated into position in a respective groove after it has reached the groove. This is an "end loading" technique in which the slots form an entry port, as contrasted with the "side loading" technique of FIGS. 1–11. Identical structures can be obtained, with the sole important difference residing in the nature of the entry ports.

As can be seen from the foregoing, this device provides a novel assembly technique which is particularly suitable for all metal magnetic recording heads. The cores are readily wound by the special mechanism and technique shown in FIG. 1, and are readily assembled in the body by the illustrated techniques, wherein all operations are subject to ready control over tolerances and can be performed by relatively unskilled personnel.

It will be observed that the core laminations are each of a single piece, thereby eliminating the back gap common to many magnetic recording heads. Elimination of the back gap results in a low cross talk sensitivity.

This assembly technique also enables the gaps readily to be set to very close tolerances which has heretofore been most difficult.

Another advantage of the assembly technique shown and of the resulting construction is that it is possible to pre-select the core assemblies for inductance and capacitance characteristics.

Still another advantage inherent in the assembly technique is that the body provides a jig within which the cores and gaps are readily and exactly positioned.

It is evident from the foregoing that excellent alignment of the cores and the gaps is attainable by extremely simple assembly operations.

While two entry ports are used in the preferred embodiment of the invention as illustrated, it will be understood that the gist of the invention is to provide a generally arcuate seat for a generally arcuate portion of the cores, thereby permitting angular adjustment of the core on its respective groove. It is possible to assemble the device through only a single entry port which may be located in faces other than those shown, if desired.

It will further be noted that this device does not require a split case with its attendant disadvantages and difficulties of manufacture and assembly. Instead, it utilizes a single, continuous case, and the construction provides continuity of all components, and requires little, if any, stressing and resultant modification of the magnetic characteristics of the components.

This invention is not to be limited by the embodiments shown in the drawings and described in the description which are given by way of example and not of limitation, but only in accordance with the scope of the appended claims.

I claim:

1. A magnetic recording head comprising: a rigid, continuous and unitary body having an internal cavity bounded at least in part by a pair of parallel, spaced-apart side walls and circularly arcuate surface having a radius and extending between the said walls, said body also having an opening in one face thereof, said opening communicating with said cavity; a gapped, wound core attached to the body in said cavity, said core comprising a stack of unitary laminations each having a pair of rigidly joined arms with a gap therebetween, and an outer periphery at the end of the stack away from the gap which includes a circularly arcuate surface having a radius and facing away from the gap, the radii being substantially equal, whereby the core may be inserted in the cavity and the arcuate surfaces bearing against each other, the elevational position of the core thereby being determined and supported, and the radial position of the core being subject to adjustment at the same elevation prior to permanent attachment of the core to the body.

2. A magnetic recording head according to claim 1 in which the entire cavity is filled with potting material in order to hold the core in place and attached to the body.

3. A magnetic recording head according to claim 1 in which the periphery of the stack includes a second circularly arcuate surface, said second circularly arcuate surface lying adjacent to the gap, and in which the cavity is additionally bounded by a second circularly arcuate surface which faces away from the opening, all of said circularly arcuate surfaces having the same center of curvature, and substantially equal radii of curvature, whereby the elevational position of the stack in the cavity is determined and supported by two sets of oppositely facing arcuate surfaces which additionally permit an initial rotational adjustment of the stack in the cavity.

4. A magnetic recording head according to claim 1 in which the width of the stack is substantially equal to the spacing between the said side walls.

5. A magnetic recording head according to claim 4 in which the periphery of the stack includes a second circularly arcuate surface, said second circularly arcuate surface lying adjacent to the gap, and in which the cavity is additionally bounded by a second circularly arcuate surface which faces away from the opening, all of said circularly arcuate surfaces having the same center of curvature, and substantially equal radii of curvature whereby the elevational position of the stack in the cavity is determined and supported by two sets of oppositely facing arcuate surfaces which additionally permit an initial rotational adjustment of the stack in the cavity.

6. A magnetic recording head according to claim 1 in which a second opening and second circularly arcuate surface bounded by side walls are laterally spaced from the first-named opening and side walls in the body, there being a shield inserted therein and attached to the body.

7. A magnetic recording head according to claim 6 in which the entire cavity is filled with potting material in order to hold the core and shield in place and attached to the body.

References Cited

UNITED STATES PATENTS

| | | | |
|---|---|---|---|
| 2,493,742 | 1/1950 | Begun et al. | 179—100.2 |
| 2,915,812 | 12/1959 | Rettinger | 179—100.2 |
| 2,923,779 | 2/1960 | Namenyi-Katz | 340—174.1 |
| 3,092,692 | 6/1963 | Javorik | 179—100.2 |

BERNARD KONICK, *Primary Examiner.*

J. R. GOUDEAU, *Assistant Examiner.*